(12) United States Patent
Hu et al.

(10) Patent No.: US 11,662,650 B2
(45) Date of Patent: May 30, 2023

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Liang-Ting Ho, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 405 days.

(21) Appl. No.: 16/898,813

(22) Filed: Jun. 11, 2020

(65) Prior Publication Data

US 2021/0026096 A1     Jan. 28, 2021

Related U.S. Application Data

(60) Provisional application No. 62/879,190, filed on Jul. 26, 2019.

(30) Foreign Application Priority Data

Feb. 3, 2020   (CN) .......................... 202020150610.0

(51) Int. Cl.
| | |
|---|---|
| *G03B 13/36* | (2021.01) |
| *G02B 7/04* | (2021.01) |
| *G02B 27/64* | (2006.01) |
| *G03B 5/00* | (2021.01) |
| *H02K 41/035* | (2006.01) |

(Continued)

(52) U.S. Cl.
CPC .............. *G03B 13/36* (2013.01); *G01P 15/02* (2013.01); *G02B 7/04* (2013.01); *G02B 7/08* (2013.01); *G02B 7/09* (2013.01); *G02B 27/646* (2013.01); *G03B 5/00* (2013.01); *G03B 5/02* (2013.01); *H02K 33/18* (2013.01); *H02K 41/0354* (2013.01); *H02K 41/0356* (2013.01); *H04N 23/50* (2023.01); *H04N 23/51* (2023.01); *H04N 23/54* (2023.01); *H04N 23/55* (2023.01); *H04N 23/57* (2023.01); *G03B 2205/0007* (2013.01);

(Continued)

(58) Field of Classification Search
CPC . G03B 13/36; G03B 5/00; G02B 7/04; G02B 27/646
See application file for complete search history.

(56) References Cited

U.S. PATENT DOCUMENTS 8,531,534 B2 *   9/2013   Hu ..................... H04N 5/23248
                                                         348/208.11
9,341,860 B2 *   5/2016   Wu ....................... G02B 27/646
(Continued)

FOREIGN PATENT DOCUMENTS

CN           209486373 U       10/2019

OTHER PUBLICATIONS

Office Action of CN Application No. 202020150610.0, dated Aug. 5, 2020, 2 pages.

*Primary Examiner* — Cara E Rakowski
(74) *Attorney, Agent, or Firm* — Muncy, Geissler, Olds & Lowe, P.C.

(57) ABSTRACT

An optical element driving mechanism has an optical axis and includes a fixed portion, a movable portion, a driving portion, and an elastic element. The movable portion is movable relative to the fixed portion. The driving portion drives the movable portion to move relative to the fixed portion. The elastic element connects the fixed portion and the movable portion.

19 Claims, 10 Drawing Sheets

(51) Int. Cl.
  *G02B 7/08*     (2021.01)
  *G02B 7/09*     (2021.01)
  *G01P 15/02*    (2013.01)
  *G03B 5/02*     (2021.01)
  *H02K 33/18*    (2006.01)
  *H04N 23/50*    (2023.01)
  *H04N 23/51*    (2023.01)
  *H04N 23/54*    (2023.01)
  *H04N 23/55*    (2023.01)
  *H04N 23/57*    (2023.01)

(52) U.S. Cl.
  CPC ............. *G03B 2205/0069* (2013.01); *G03B 2205/0076* (2013.01)

(56) References Cited

U.S. PATENT DOCUMENTS

| | | | | |
|---|---|---|---|---|
| 9,491,362 B2 * | 11/2016 | Hu | .................... | H04N 5/232 |
| 9,772,506 B2 * | 9/2017 | Hu | .................... | G02B 27/646 |
| 9,785,038 B2 * | 10/2017 | Wu | .................... | G02B 27/646 |
| 9,904,072 B2 * | 2/2018 | Fan | .................... | H02K 41/0356 |
| 9,927,681 B2 * | 3/2018 | Hu | .................... | G03B 7/04 |
| 10,101,595 B2 * | 10/2018 | Hu | .................... | G02B 27/646 |
| 10,133,038 B2 * | 11/2018 | Hu | .................... | H04N 5/247 |
| 10,139,586 B2 * | 11/2018 | Chan | .................... | G02B 7/026 |
| 10,168,506 B2 * | 1/2019 | Chen | .................... | H04N 5/23287 |
| 10,185,115 B2 * | 1/2019 | Wang | .................... | G02B 7/023 |
| 10,203,471 B2 * | 2/2019 | Kuo | .................... | G02B 7/10 |
| 10,203,516 B2 * | 2/2019 | Hu | .................... | G03B 5/00 |
| 10,254,505 B2 * | 4/2019 | Hu | .................... | G02B 7/08 |
| 10,261,284 B2 * | 4/2019 | Huang | .................... | G03B 3/10 |
| 10,303,042 B2 * | 5/2019 | Yu | .................... | G02B 7/08 |
| 10,338,403 B2 * | 7/2019 | Hu | .................... | G02B 27/646 |
| 10,345,613 B2 * | 7/2019 | Hu | .................... | H04N 5/23248 |
| 10,365,500 B2 * | 7/2019 | Hu | .................... | G02B 7/09 |
| 10,371,960 B2 * | 8/2019 | Hu | .................... | G03B 7/04 |
| 10,401,641 B2 * | 9/2019 | Hu | .................... | G02B 7/08 |
| 10,409,028 B2 * | 9/2019 | Hu | .................... | H02K 41/00 |
| 10,416,532 B2 * | 9/2019 | Hu | .................... | F03G 7/065 |
| 10,423,005 B2 * | 9/2019 | Hu | .................... | G02B 27/646 |
| 10,432,834 B2 * | 10/2019 | Liu | .................... | H04N 5/2253 |
| 10,447,931 B2 * | 10/2019 | Hu | .................... | H04N 5/23287 |
| 10,495,897 B2 * | 12/2019 | Kuo | .................... | G02B 27/646 |
| 10,502,974 B2 * | 12/2019 | Hu | .................... | G03B 5/00 |
| 10,520,697 B2 * | 12/2019 | Hu | .................... | G02B 26/085 |
| 10,606,022 B2 * | 3/2020 | Hsu | .................... | G02B 7/026 |
| 10,613,295 B2 * | 4/2020 | Chen | .................... | H04N 5/23287 |
| 10,616,487 B2 * | 4/2020 | Hu | .................... | H04N 5/2257 |
| 10,620,397 B2 * | 4/2020 | Hsu | .................... | H04N 5/2254 |
| 10,627,701 B2 * | 4/2020 | Yu | .................... | G03B 7/04 |
| 10,634,929 B2 * | 4/2020 | Chan | .................... | H02K 41/0356 |
| 10,638,031 B1 * | 4/2020 | Brodie | .................... | G03B 5/00 |
| 10,641,984 B2 * | 5/2020 | Wu | .................... | G02B 7/021 |
| 10,649,172 B2 * | 5/2020 | Liu | .................... | H02K 41/0354 |
| 10,656,431 B2 * | 5/2020 | Hu | .................... | G02B 27/646 |
| 10,684,447 B2 * | 6/2020 | Wu | .................... | G02B 7/10 |
| 10,690,880 B2 * | 6/2020 | Huang | .................... | G02B 7/09 |
| 10,700,119 B2 * | 6/2020 | Hu | .................... | G03B 3/10 |
| 10,705,311 B2 * | 7/2020 | Huang | .................... | G02B 7/08 |
| 10,712,580 B2 * | 7/2020 | Hu | .................... | G03B 5/00 |
| 10,718,952 B2 * | 7/2020 | Lee | .................... | G02B 7/09 |
| 10,747,088 B2 * | 8/2020 | Hu | .................... | G02B 27/646 |
| 10,750,065 B2 * | 8/2020 | Wu | .................... | H04N 5/2257 |
| 10,754,124 B2 * | 8/2020 | Ho | .................... | G02B 27/64 |
| 10,761,291 B2 * | 9/2020 | Kuo | .................... | G02B 13/0015 |
| 10,764,475 B2 * | 9/2020 | Hu | .................... | G02B 7/026 |
| 10,809,487 B2 * | 10/2020 | Chen | .................... | G02B 7/102 |
| 10,816,874 B2 * | 10/2020 | Hsu | .................... | G03B 3/10 |
| 10,823,933 B2 * | 11/2020 | Huang | .................... | G02B 7/09 |
| 10,830,981 B2 * | 11/2020 | Chan | .................... | G02B 7/09 |
| 10,866,385 B2 * | 12/2020 | Hu | .................... | H04N 5/2258 |
| 10,866,394 B2 * | 12/2020 | Yu | .................... | G02B 27/646 |
| 10,895,755 B2 * | 1/2021 | Yu | .................... | G02B 27/646 |
| 10,901,171 B2 * | 1/2021 | Kuo | .................... | G02B 7/08 |
| 10,904,440 B2 * | 1/2021 | Kuo | .................... | G03B 3/10 |
| 10,935,809 B2 * | 3/2021 | Hu | .................... | G02B 27/646 |
| 10,942,298 B2 * | 3/2021 | Fu | .................... | G02B 6/0066 |
| 10,962,735 B2 * | 3/2021 | Wang | .................... | H02K 41/0356 |
| 10,969,561 B2 * | 4/2021 | Hu | .................... | G03B 3/02 |
| 10,976,476 B2 * | 4/2021 | Fan | .................... | H04N 5/2254 |
| 11,002,891 B2 * | 5/2021 | Kao | .................... | G02B 3/14 |
| 11,029,453 B2 * | 6/2021 | Hu | .................... | G03B 17/17 |
| 11,032,472 B2 * | 6/2021 | Hu | .................... | H01L 29/4991 |
| 11,067,823 B2 * | 7/2021 | Chan | .................... | G02B 27/646 |
| 11,086,050 B2 * | 8/2021 | Hsu | .................... | G02B 26/004 |
| 11,095,819 B2 * | 8/2021 | Hu | .................... | G02B 27/646 |
| 11,106,000 B2 * | 8/2021 | Hu | .................... | G03B 3/10 |
| 11,125,920 B2 * | 9/2021 | Fan | .................... | F03G 7/0614 |
| 11,131,827 B2 * | 9/2021 | Hu | .................... | G02B 27/646 |
| 11,159,729 B2 * | 10/2021 | Kuo | .................... | H04N 5/2254 |
| 11,181,669 B2 * | 11/2021 | Hu | .................... | G02B 7/102 |
| 11,181,713 B2 * | 11/2021 | Hu | .................... | G03B 5/04 |
| 11,187,965 B2 * | 11/2021 | Hu | .................... | G02B 27/646 |
| 11,204,480 B2 * | 12/2021 | Hu | .................... | H02K 5/24 |
| 11,215,783 B2 * | 1/2022 | Lin | .................... | G02B 7/08 |
| 11,223,754 B2 * | 1/2022 | Kao | .................... | G03B 3/10 |
| 11,256,058 B2 * | 2/2022 | Hsu | .................... | G02B 7/08 |
| 11,256,063 B2 * | 2/2022 | Huang | .................... | G03B 3/10 |
| 11,256,065 B2 * | 2/2022 | Chen | .................... | G02B 7/09 |
| 11,256,107 B2 * | 2/2022 | Hu | .................... | G02B 7/08 |
| 11,262,528 B2 * | 3/2022 | Lin | .................... | H02K 5/24 |
| 11,287,605 B2 * | 3/2022 | Huang | .................... | G03B 13/36 |
| 11,287,725 B2 * | 3/2022 | Weng | .................... | G03B 3/02 |
| 11,294,140 B2 * | 4/2022 | Wu | .................... | G02B 7/08 |
| 11,294,141 B2 * | 4/2022 | Kao | .................... | G02B 27/646 |
| 11,300,803 B2 * | 4/2022 | Lin | .................... | H02K 11/215 |
| 11,300,804 B2 * | 4/2022 | Chan | .................... | G02B 7/028 |
| 11,314,033 B2 * | 4/2022 | Hu | .................... | G02B 27/646 |
| 11,314,037 B2 * | 4/2022 | Ho | .................... | G03B 17/02 |
| 11,314,038 B2 * | 4/2022 | Wu | .................... | G03B 13/36 |
| 11,320,625 B2 * | 5/2022 | Chan | .................... | G03B 19/22 |
| 11,320,629 B2 * | 5/2022 | Ho | .................... | G02B 27/646 |
| 11,322,628 B2 * | 5/2022 | Wu | .................... | H01L 31/02002 |
| 11,340,418 B2 * | 5/2022 | Wu | .................... | H04N 5/2254 |
| 11,378,771 B2 * | 7/2022 | Huang | .................... | G02B 7/08 |
| 11,397,304 B2 * | 7/2022 | Kao | .................... | F03G 7/0614 |
| 11,397,369 B2 * | 7/2022 | Wu | .................... | G03B 9/06 |
| 11,397,370 B2 * | 7/2022 | Yu | .................... | G02B 7/08 |
| 11,422,330 B2 * | 8/2022 | Hu | .................... | H02K 41/0356 |
| 11,422,332 B2 * | 8/2022 | Ho | .................... | G02B 7/09 |
| 11,422,333 B2 * | 8/2022 | Chen | .................... | G02B 13/001 |
| 11,422,334 B2 * | 8/2022 | Fu | .................... | G02B 26/085 |
| 11,422,357 B2 * | 8/2022 | Hu | .................... | G02B 3/12 |
| 11,428,949 B2 * | 8/2022 | Hu | .................... | G02B 7/08 |
| 2016/0313532 A1 * | 10/2016 | Kuo | .................... | G02B 27/646 |
| 2018/0100987 A1 * | 4/2018 | Wu | .................... | G02B 7/10 |

\* cited by examiner

OPTICAL ELEMENT DRIVING MECHANISM

CROSS-REFERENCE TO RELATED APPLICATIONS

The present application claims priority to U.S. Provisional Patent Application No. 62/879,190, filed on Jul. 26, 2019, and China Patent Application No. 202020150610.0, filed on Feb. 3, 2020, which are incorporated by reference herein in their entirety.

BACKGROUND OF THE DISCLOSURE

Field of the Disclosure

The present invention relates to a driving mechanism, and more particularly to an optical element driving mechanism.

Description of the Related Art

The design of today's electronic devices is continually moving toward miniaturization, so that various elements or structures of optical modules used in such applications as imaging must be continuously reduced in size in order to achieve miniaturization. Therefore, how to design a miniature driving mechanism has become an important issue.

BRIEF SUMMARY OF THE DISCLOSURE

An embodiment of the invention provides an optical element driving mechanism having an optical axis, which includes a fixed portion, a movable portion, a driving portion, and an elastic element. The movable portion is movable relative to the fixed portion. The driving portion drives the movable portion to move relative to the fixed portion. The elastic element connects the fixed portion and the movable portion.

According to some embodiments of the present disclosure, the driving portion includes a plate coil, the plate coil has a plane, and the plate coil is connected to the elastic element. The movable portion has a groove, and the plate coil is disposed on the groove of the movable portion, and the plane is parallel with the optical axis. When viewed in a direction that is parallel to the optical axis, the plate coil partially overlaps the movable portion. The optical element driving mechanism further includes a welding portion connected to the plate coil and the elastic element.

According to some embodiments of the present disclosure, the optical element driving mechanism further includes a metal substrate, and the plate coil is integrally formed with the metal substrate. The metal substrate has a substrate plane, and the substrate plane is parallel to the plane of the plate coil. When viewed in a direction that is perpendicular to the optical axis, the metal substrate overlaps the plate coil. The metal substrate has a protruding portion, and the protruding portion is connected to the elastic element. The metal substrate is closer to the movable portion than the plate coil, or the plate coil is closer to the movable portion than the metal substrate.

According to some embodiments of the present disclosure, the optical element driving mechanism further includes a metal substrate, the metal substrate is connected to the plate coil and the elastic element, and the plate coil, the elastic element, and the metal substrate are integrally formed. The metal substrate includes a main body portion, a curved portion, a first flat portion, a second flat portion. The main body portion is connected with the plate coil. The curved portion is connected to the main body portion, and one end of the curved portion extends in a direction that is parallel to the optical axis, and the other end of the curved portion extends in a direction that is perpendicular to the optical axis. The first flat portion is connected to the curved portion. The second flat portion is connected to the first flat portion and the elastic element. The first flat portion extends in a direction that is perpendicular to the optical axis and away from a center of the optical axis. The second flat portion extends in a direction that is perpendicular to the optical axis and close to a center of the optical axis. The second flat portion has a positioning portion, and the second flat portion is connected to the movable portion through the positioning portion. When viewed in a direction that is parallel to the optical axis, the first flat portion partially overlaps the plate coil. When viewed in a direction that is parallel to the optical axis, the second flat portion overlaps the movable portion.

According to some embodiments of the present disclosure, the optical element driving mechanism further includes an electrical connection portion, the electrical connection portion is connected to the elastic element, and the electrical connection portion, the plate coil, the elastic element, and the metal substrate are integrally formed. When viewed in a direction that is parallel to the optical axis, the electrical connection portion overlaps the elastic element.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/− 20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
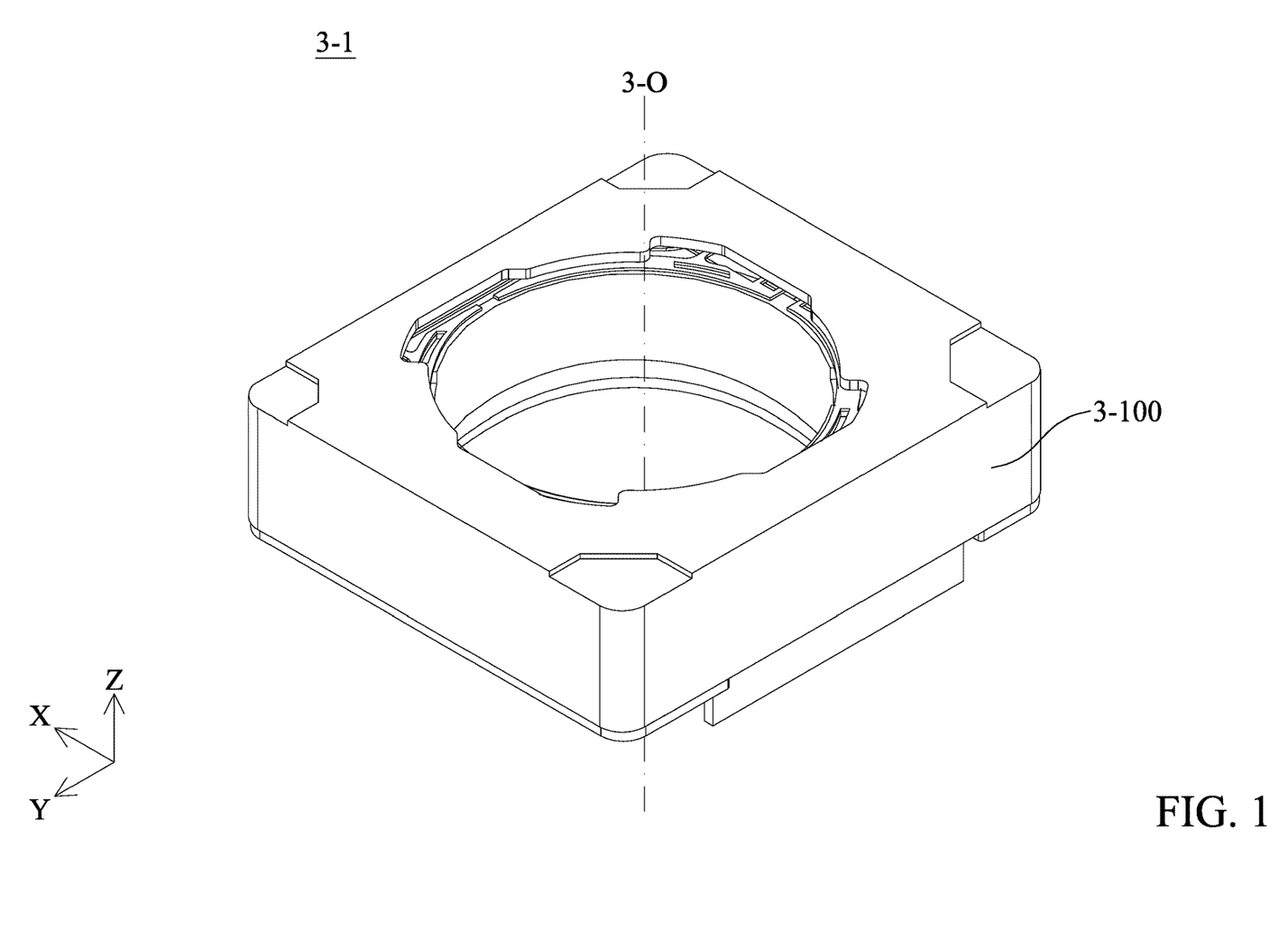
FIG. 1 is a perspective view of an optical element driving mechanism according to an embodiment of the disclosure.
Figure 2:
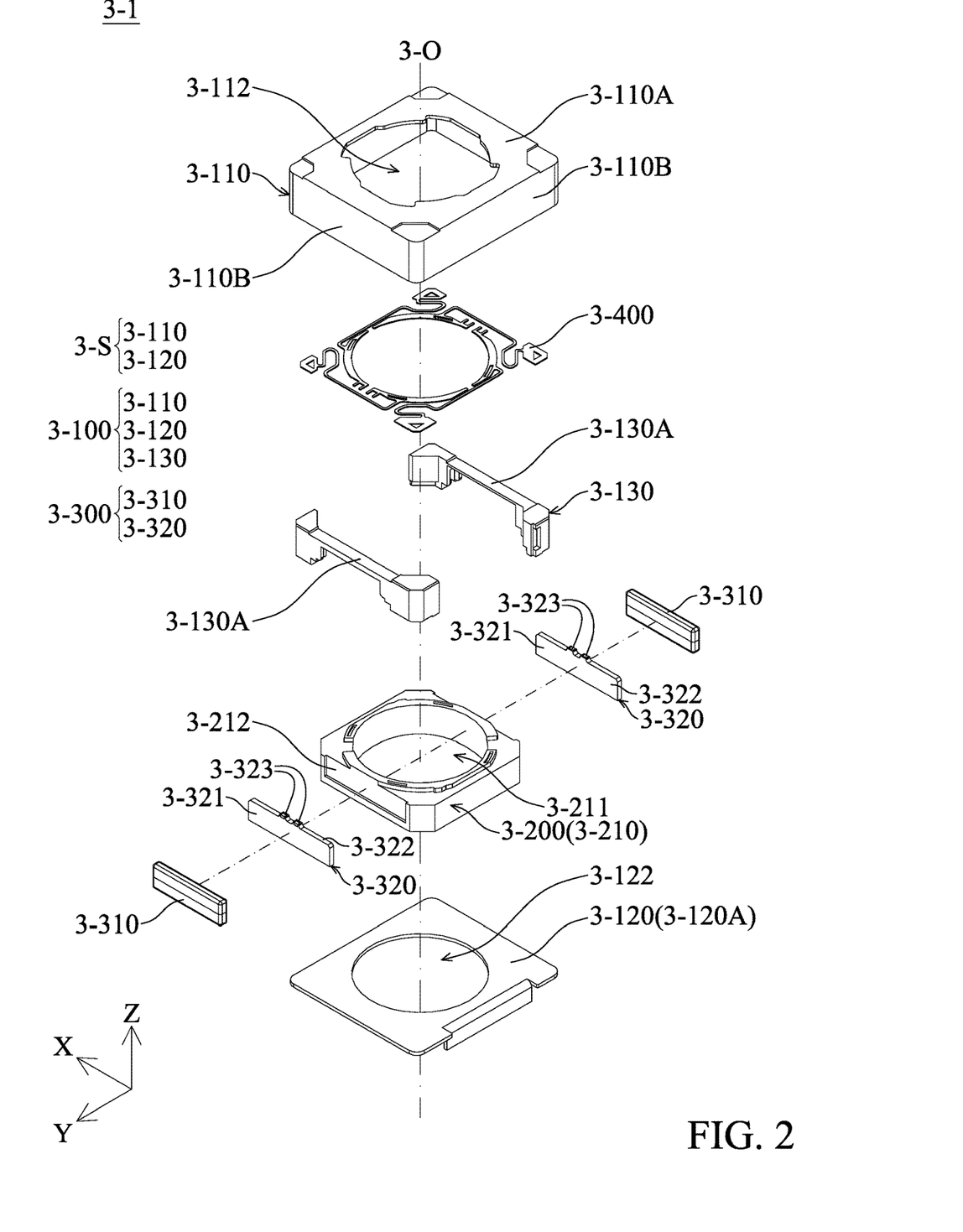
FIG. 2 is an exploded view of an optical element driving mechanism according to an embodiment of the disclosure.

Refer to FIG. 1 to FIG. 2. FIG. 1 is a perspective view of an optical element driving mechanism 3-1 according to an embodiment of the present disclosure. FIG. 2 is an exploded view of an optical element driving mechanism 3-1 according to an embodiment of the present disclosure. The optical element driving mechanism 3-1 has an optical axis 3-O and includes a fixed portion 3-100, a movable portion 3-200, a driving portion 3-300, and an elastic element 3-400. In this embodiment, the optical element driving mechanism 3-1 is a voice coil motor (VCM) with an auto focusing (AF) function, but is not limited to this. In some embodiments, the optical element driving mechanism 3-1 can also have auto focus and optical image stabilization (OIS) functions.

The fixed portion 3-100 includes a top case 3-110, a base 3-120, and a frame 3-130. The top case 3-110 has a hollow structure, and can be combined with the base 3-120 to form a housing 3-S of the optical element driving mechanisms 3-1, wherein the top case 3-110 constitutes a top wall 3-110A and four side walls 3-110B of the housing 3-S, and the base 3-120 constitute a bottom wall 3-120A of the housing 3-S. It should be understood that the top case 3-110 and the base 3-120 are formed with a top case opening 3-112 and a base opening 3-112, respectively. The center of the top case opening 3-112 corresponds to the optical axis 3-O, and the base opening 3-112 corresponds to an image-sensing element (not shown in the figures) disposed outside the optical element driving mechanism 3-1. External light may enter the top case 3-110 through the top case opening 3-112, and is received by the image-sensing element (not shown in the figures) after passing through an optical element (not shown in the figures) and the base opening 3-112, so as to generate a digital image signal. The frame 3-130 has a frame edge 3-130A, wherein the frame edge 3-130A corresponds to the side wall 3-110B of the top case 3-110.

The movable portion 3-200 may be connected with an optical element, and moves relative to the fixed portion 3-100. In this embodiment, the movable portion 3-200 is a holder 3-210, which has a through hole 3-211 and a groove 3-212, wherein the through hole 3-211 forms a threaded structure (not shown in the figures) corresponding to another threaded structure on the outer peripheral surface of the optical element, so that the optical element may be secured in the through hole 3-211.

The driving portion 3-300 includes a magnetic element 3-310 and a driving coil 3-320. The shape of the magnetic element 3-310 may be a long strip, and the magnetic element 3-310 may be fixed to the frame edge 3-130A of the frame 3-130. In some embodiments, the magnetic element 3-310 may have other different shapes, and the magnetic element 3-310 may be affixed to four corners of the frame 3-130.

In this embodiment, the driving coil 3-320 is a plate coil 3-320 made using Flexible Printed Circuit (FPC) technology. The plate coil 3-320 is rectangular and has a plane 3-321, an insulating layer 3-322, a coil 3-323, and an electronic element (not shown in the figures). The plate coil 3-320 is disposed on the groove 3-212 of the holder 3-210, and the plane 3-321 is parallel with the optical axis 3-O. When viewed in a direction that is parallel to the optical axis 3-O, the plate coil 3-320 partially overlaps the holder 3-210. In other words, the plate coil 3-320 is partially received in the groove 3-212, but is not limited this. In some embodiments, the plate coil 3-320 may also be completely received in the groove 3-212.

The number of the grooves 3-212, the plate coils 3-320, and the magnetic elements 3-310 is not limited, and may be determined according to requirements. In some embodiments of the present invention, four plate coils 3-320 are disposed on four grooves 3-212 of the holder 3-210, and correspond to four magnetic elements 3-310 disposed on the frame 3-130. In some embodiments of the present invention, two plate coils 3-320 are disposed on the opposite sides of two grooves 3-212 of the base 3-210, and correspond to two magnetic elements 3-310 disposed on the opposite sides of the frame 3-130.

Figure 3:
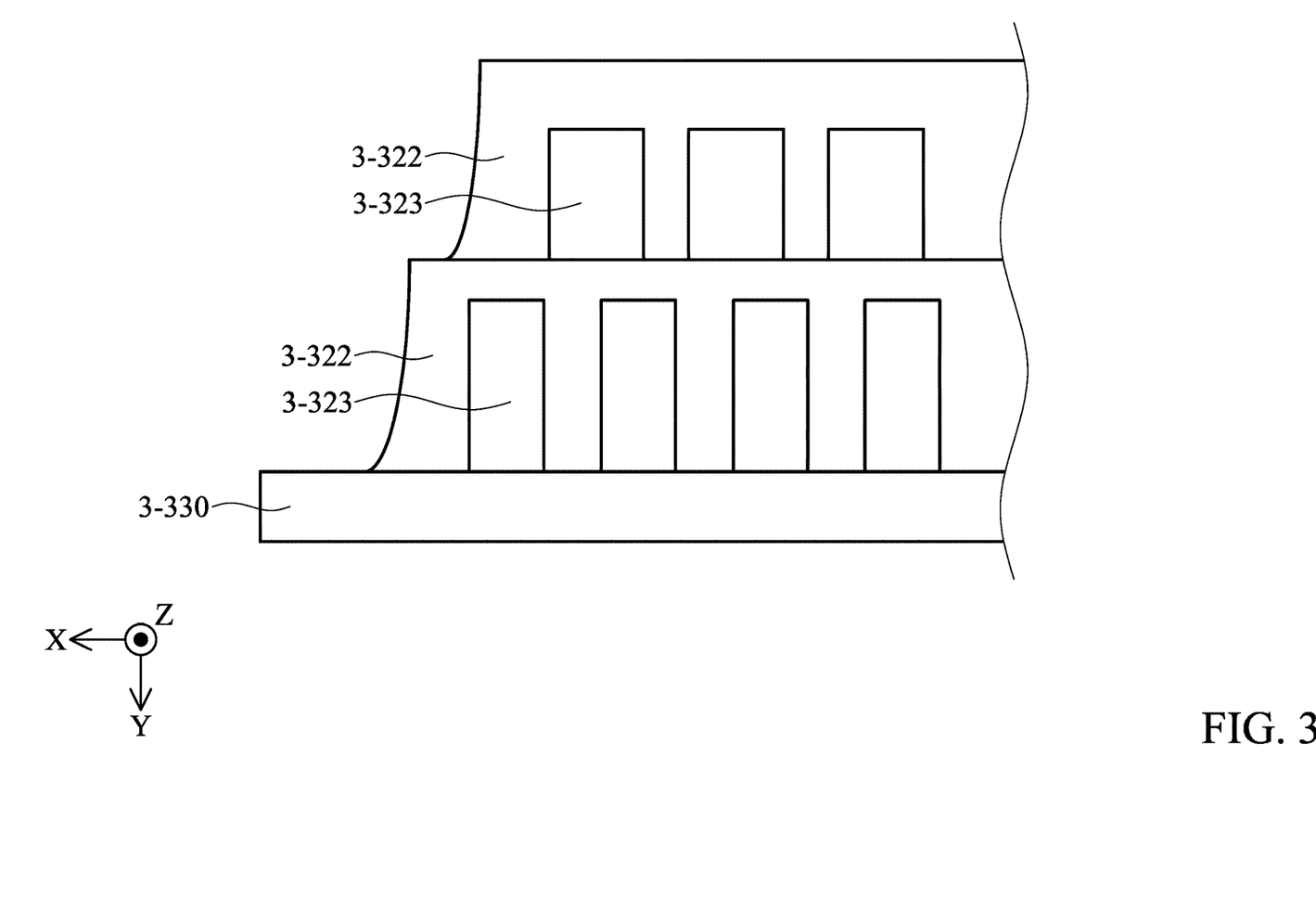
FIG. 3 is a schematic diagram of the internal structure of a plate coil according to an embodiment of the disclosure.

As shown in FIG. 3, FIG. 3 is a schematic diagram of an internal structure of a plate coil according to an embodiment of the present disclosure. The coil of the plate coil 3-320 in this embodiment is designed as two layers. The insulating layer 3-322 covers the coil 3-323. The material of the coil 3-323 is copper, and the material of insulating layer 3-322 is Polyimide (PI). The plate coil 3-320 process may be used in two ways. The first is lamination. First, an organic film is covered with a laminator on the entire copper foil, after an exposure and development process, the desired copper coil will be formed. The second is plating. First, a barrier layer (such as ink) is added to a portion that is not to be conductive, then copper is electroplated to the required thickness, and the coil will be formed after the barrier layer is removed. The formation of the two layers of the coil may use one of the methods, or both of the methods.

Compared with the conventional winding-type driving coil, which is exposed to the outside, the coil 3-323 of the plate coil 3-320 is covered with the insulating layer 3-322, so that it is not easily broken by the collision of the magnetic element 3-310 when the holder 3-210 is driven by a magnetic force or when the optical element driving mechanism 3-1 is subjected to an external force. In addition, the winding-type driving coil is difficult to precisely control the tightness of the winding, so the wire pitch tolerance is large. The plate coil 3-320 obtained by the process described above has a small wire pitch tolerance. Because the winding-type driving coil needs to design a winding post on a holder to wind and position the coil, besides, a lead groove and a welding point must also be designed to connect the coil to other elements (such as the elastic element 3-400), so that the design of the holder may be more complicated. The plate coil 3-320 is easy to control because of its shape and size, so that is it more precise and convenient when assembling and positioning the plate coil 3-320 to the holder 3-210. In addition, the holder 3-210 only needs to be designed with the grooves 3-212 to receive the plate coil 3-320, so it may achieve the miniaturization of the overall mechanism compared to the complicated design of holder using the conventional winding-type driving coil.

In this embodiment, the elastic element 3-400 is a metal spring, and the elastic element 3-400 connects the fixed portion 3-100 and the movable portion 3-200. More specifically, one end of the elastic element 3-400 is connected to the holder 3-210, and the other end of the elastic element 3-400 is connected to the frame 3-130, and the holder 3-210 is suspended in the frame 3-130 by the elastic element 3-400.

The elastic element 3-400 is further connected to a circuit component (not shown in the figures) and the plate coil 3-320. After a current is applied to the circuit component, the current flows through the elastic element 3-400 to the plate coil 3-320, then the driving portion 3-300 drives the movable portion 3-200 to move relative to the fixed portion 3-100. More specifically, the current flows through the elastic element 3-400 to the plate coil 3-320 by the electrical connection described above, then the plate coil 3-320 acts with the magnetic field of the magnetic element 3-310 to generate an electromagnetic force, and the electromagnetic force drives the holder 3-210 to move in a direction that is parallel to the optical axis 3-O, thereby achieving the effect of fast focusing.

Figure 4:
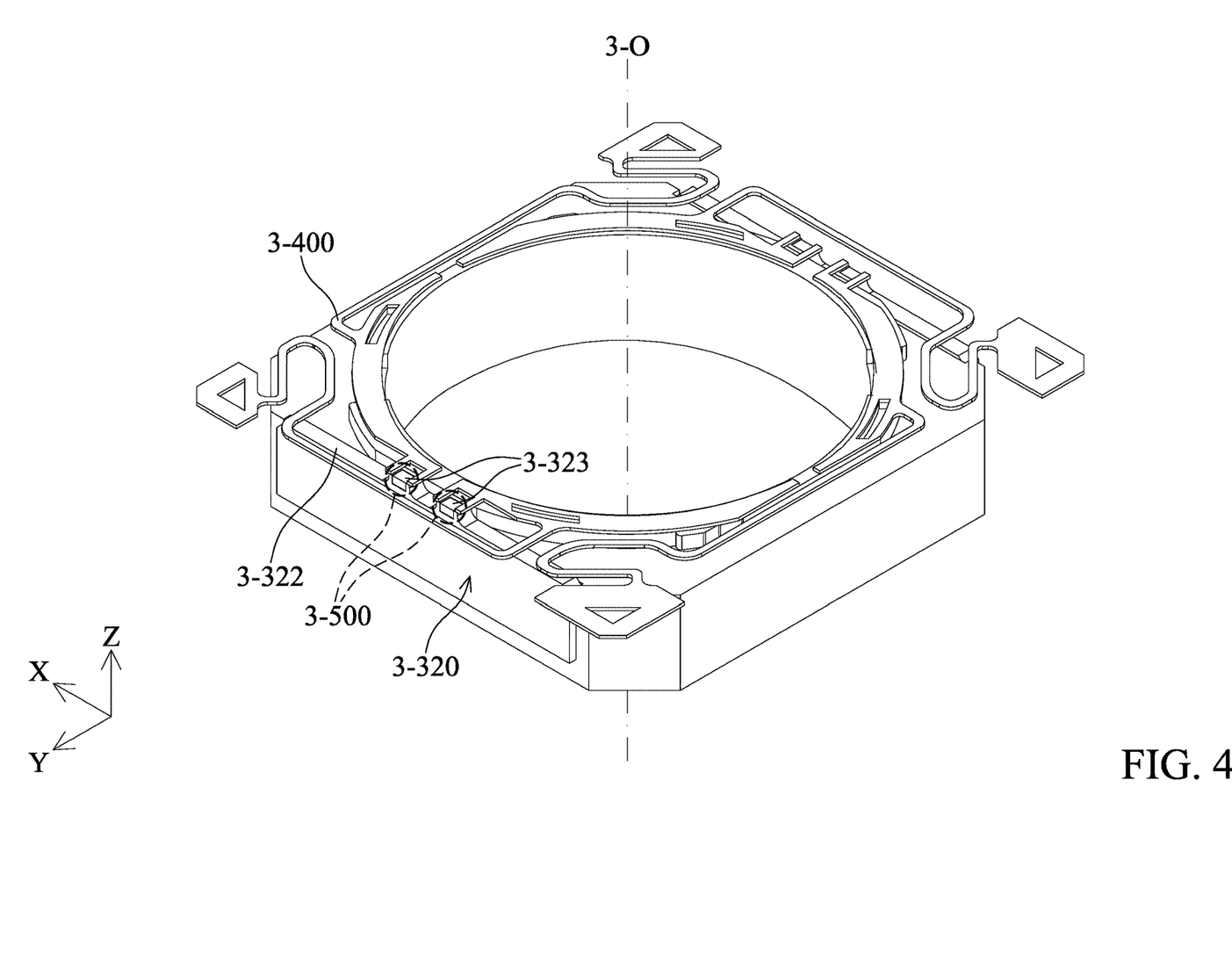
FIG. 4 is a schematic diagram of a partial structure of an optical element driving mechanism according to an embodiment of the disclosure.

Refer to FIG. 4. FIG. 4 is a schematic diagram of a partial structure of the optical element driving mechanism 3-1 according to an embodiment of the present disclosure. In this embodiment, the optical element driving mechanism 3-1 further includes a welding portion 3-500. The welding portion 3-500 is connected to the plate coil 3-320 and the elastic element 3-400. With this connection, the plate coil 3-320 does not need to pull out the lead wire and design the lead wire connection path to connect to the elastic element 3-400 as in the conventional winding type coil. It only needs to expose the coil 3-323 from the insulating layer 3-322, and use the welding portion 3-500 (in this embodiment, a solder ball is used) to weld, so that the plate coil 3-320 and the elastic element 3-400 may be electrically connected simply.

Figure 5:
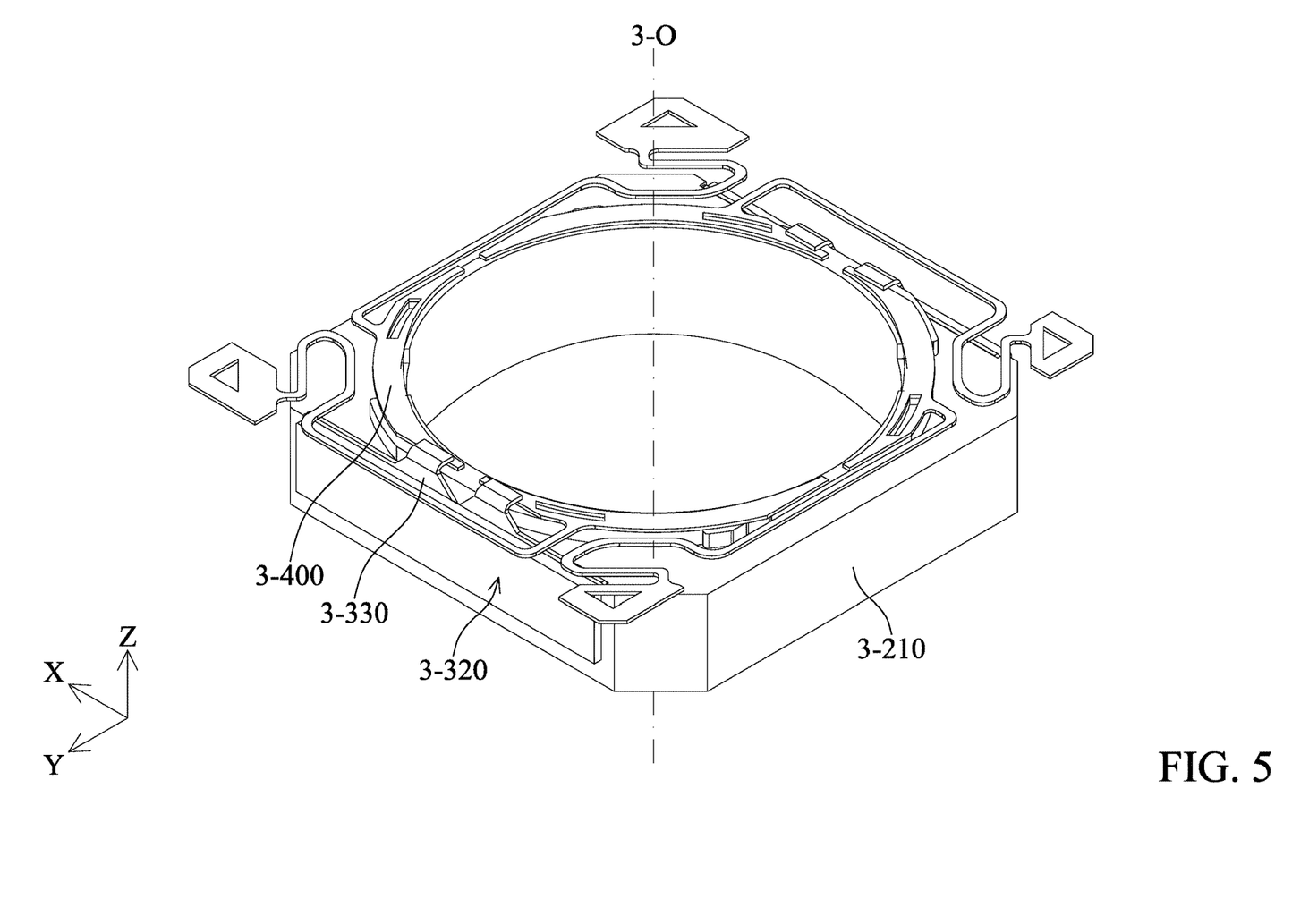
FIG. 5 is a schematic diagram of a partial structure of an optical element driving mechanism according to another embodiment of the disclosure.
Figure 6:
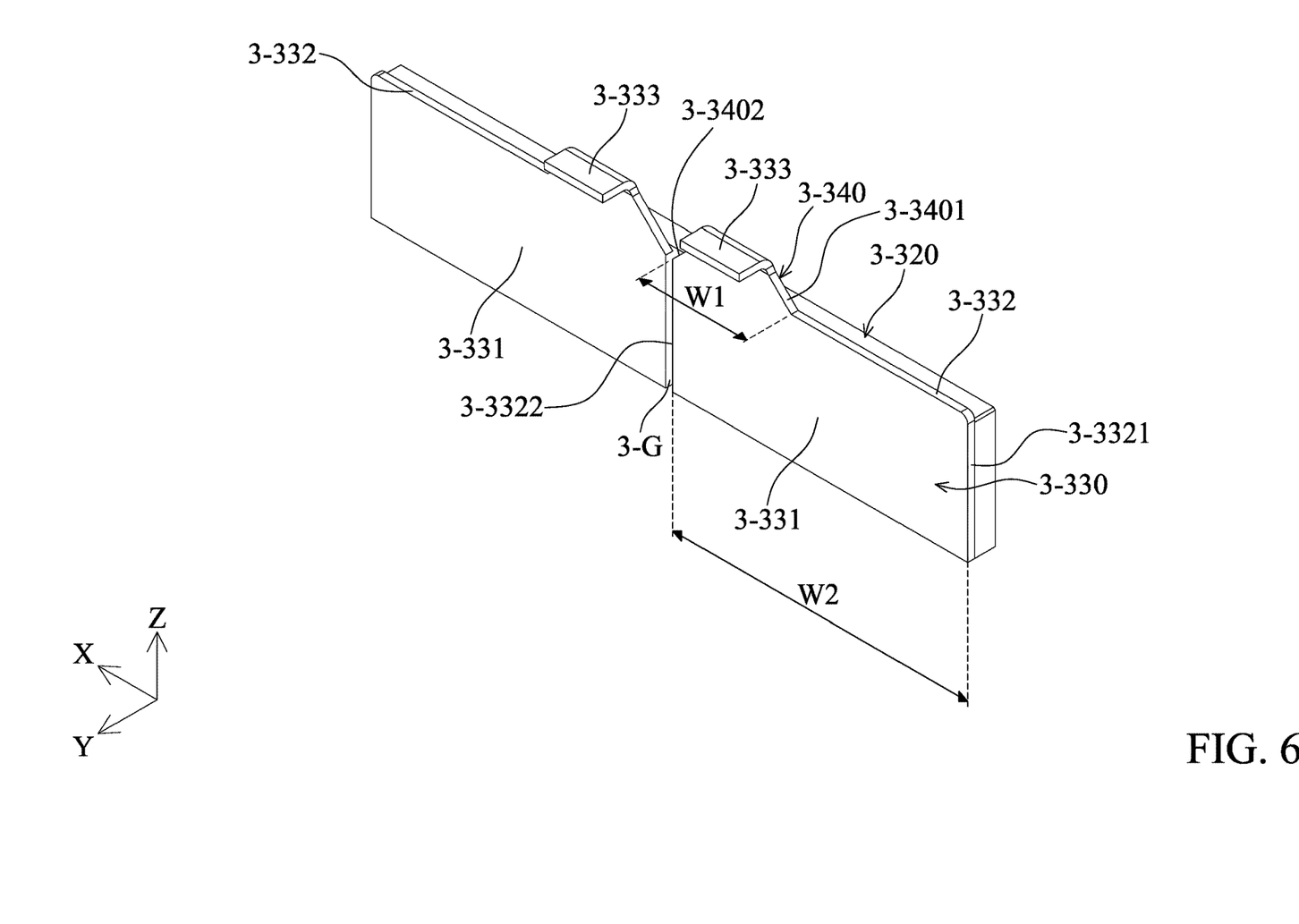
FIG. 6 is a schematic diagram of a partial structure of an optical element driving mechanism according to another embodiment of the disclosure.

Refer to FIGS. 5 to FIG. 6, which are schematic diagrams of a partial structure of the optical element driving mechanism 3-1 according to another embodiment of the present disclosure. As shown in FIG. 5, in this embodiment, the optical element driving mechanism 3-1 includes a metal substrate 3-330, and the flat plate coil 3-320 and the metal substrate 3-330 are integrally formed. In the manufacturing process of the plate coil 3-320, the metal substrate 3-330 is usually used to support the plate coil 3-320, and removed in the end of the process. In this embodiment, the metal substrate 3-330 is not removed in the process, thus the plate coil 3-320 with the metal substrate 3-330 may be directly obtained. The plate coil 3-320 with the metal substrate 3-330 may make the overall structure stronger. In addition, the metal substrate 3-330 has the effect of magnetic permeability.

In this embodiment, as shown in FIG. 6, the metal substrate 3-330 has a substrate plane 3-331, a main body portion 3-332, a protruding portion 3-333, and an extending portion 3-340. Since the plate coil 3-320 is directly manufactured on the metal substrate 3-330 as mentioned above, the substrate plane 3-331 is parallel with the plane 3-321 of the plate coil 3-320, and when viewed in a direction that is perpendicular to the optical axis 3-0, the metal substrate 3-330 overlaps the plate coil 3-320. The magnetic element 3-310 and the plate coil 3-320 each have two, corresponding to and arranged on opposite sides. When the plate coil 3-320 is disposed on the holder 3-210, the metal substrate 3-330 is closer to the holder 3-210 than the plate coil 3-320, but is not limited to this. In some embodiments, the plate coil 3-320 is closer to the holder 3-210 than the metal substrate 3-330. The extending portion 3-340 is between the main body portion 3-332 and the protruding portion 3-333. The extending portion 3-340 is parallel to the main body portion 3-332. The extending portion 3-340 is perpendicular to the protruding portion 3-333. The main body portion 3-332 includes a first edge 3-3321 and a second edge 3-3322. The extending portion 3-340 includes a first edge 3-3401 and a second edge 3-3402. The maximum width W1 defined by the first edge 3-3401 and the second edge 3-3402 of the extending portion 3-340 is smaller than the width W2 defined by the first edge 3-3321 and the second edge 3-3322 of the main body portion 3-332.

The main body portion 3-332 of the metal substrate 3-330 is connected to the plate coil 3-320, and the protruding portion 3-333 is connected to the elastic element 3-400. More specifically, as shown in FIG. 6, there is a gap 3-G in the middle of the metal substrate 3-330, so that two metal substrates 3-330 correspond one plate coil 3-320 substantially, and each of the two metal substrates 3-330 has a protruding portion 3-333, and the protruding portion 3-333 may be connected to the elastic element 3-400 by solder ball welding as in the embodiment of FIG. 3 or laser welding. That is, the plate coil 3-320 is electrically connected to the main body portion 3-332 of the metal substrate 3-330, and may be electrically connected to the elastic element 3-400 through the protruding portion 3-333 of the metal substrate 3-330. With the design of this embodiment, the two plate coils 3-320 may be electrically connected to the four elastic elements 3-400. However, it is not limited to this. In some embodiments, there is no gap 3-G on the metal substrate 3-330, so one metal substrate 3-330 corresponds to one plate coil 3-320, and the four elastic elements 3-400 is connected to four plate coils 3-320.

Figure 7:
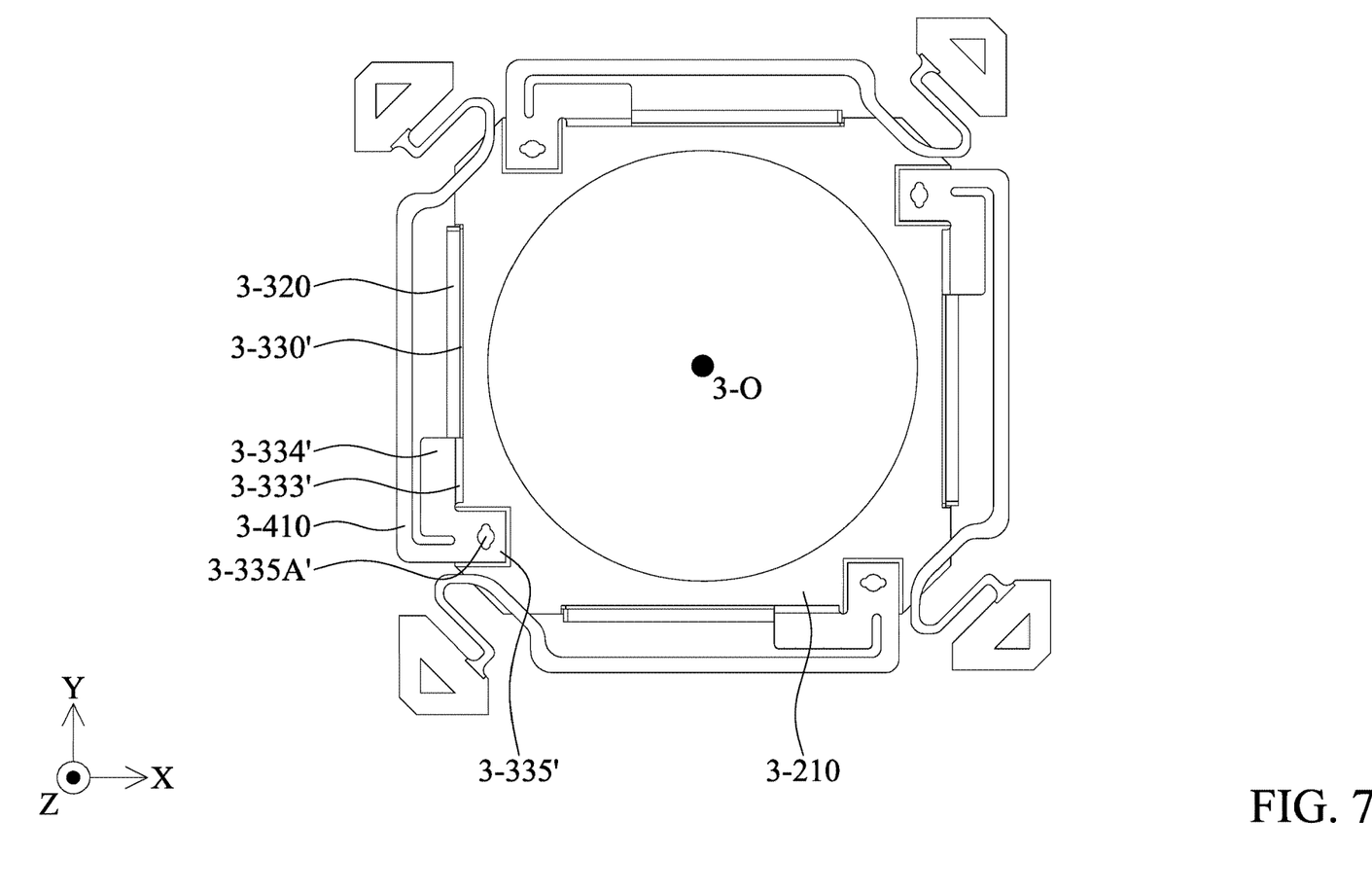
FIG. 7 is a schematic diagram of a partial structure of an optical element driving mechanism according to another embodiment of the disclosure.
Figure 8:
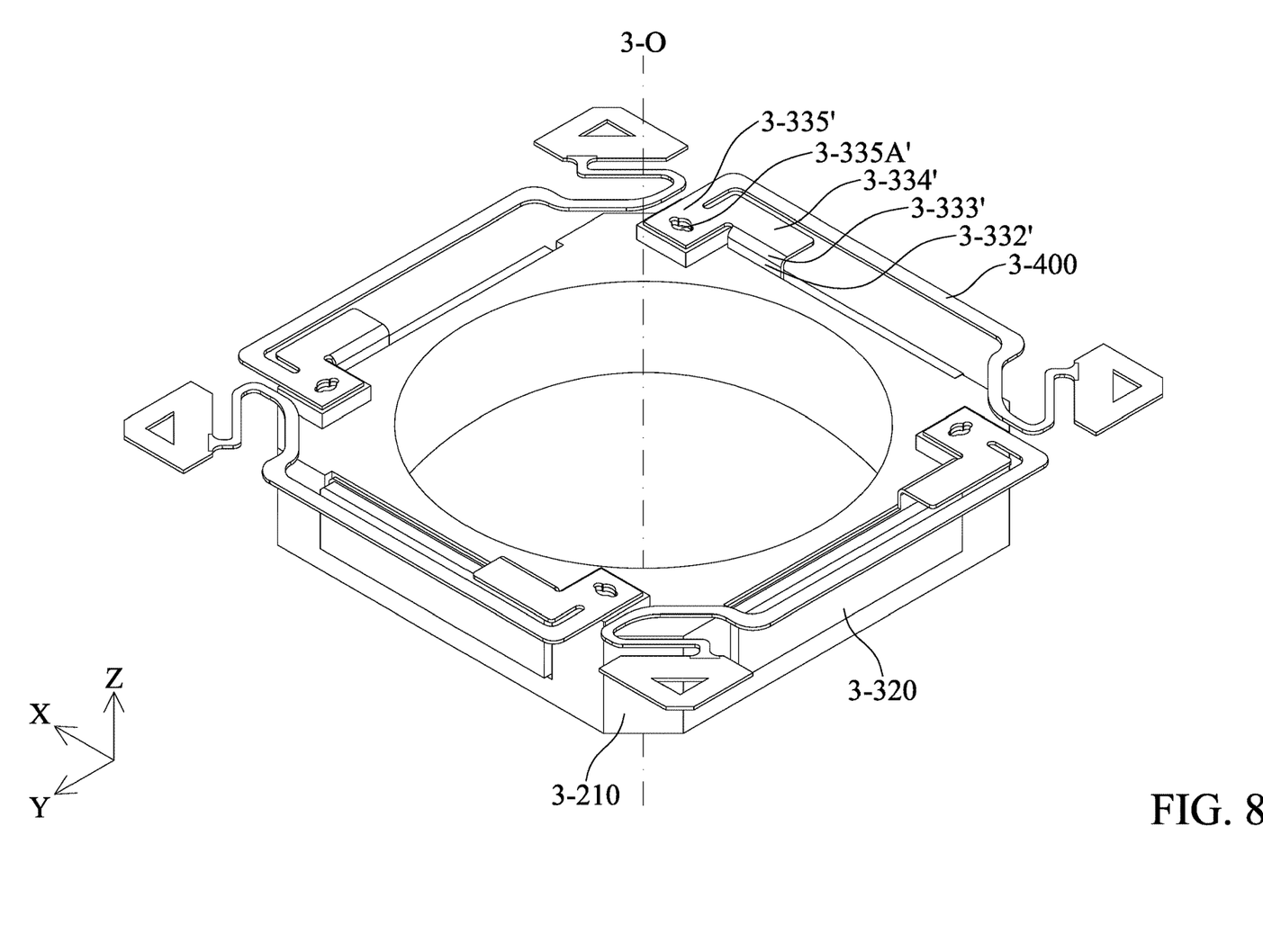
FIG. 8 is a schematic diagram of a partial structure of an optical element driving mechanism according to another embodiment of the disclosure.

Refer to FIG. 7 to FIG. 8. FIG. 7 and FIG. 8 are schematic diagrams of a partial structure of the optical element driving mechanism 3-1 according to another embodiment of the present disclosure. As shown in FIG. 7, in this embodiment, the optical element driving mechanism 3-1 further includes a metal substrate 3-330', and the metal substrate 3-330' is connected to the plate coil 3-320 and the elastic element 3-400. In addition, the plate coil 3-320, the elastic element 3-400, and the metal substrate 3-330' are integrally formed. The metal substrate 3-330' has a main body portion 3-332', a curved portion 3-333', and a first flat portion 3-334' and a second flat portion 3-335'.

As shown in FIG. 7 and FIG. 8, the curved portion 3-333' extends in a direction that is parallel to the optical axis 3-0 and is connected to the main body portion 3-332', and the curved portion 3-333' extends in a direction that is perpendicular to the optical axis 3-O and is connected to the first flat portion 3-334', and the second flat portion 3-335' is connected to the first flat portion 3-334' and the elastic element 3-400. The first flat portion 3-334' extends in a direction that is perpendicular to the optical axis 3-O and away from a center of the optical axis 3-O. When viewed in a direction that is parallel to the optical axis 3-O, the first flat portion 3-334' partially overlaps the plate coil 3-320. The second flat portion 3-335' has a positioning portion 3-335A', and the second flat portion 3-335' is connected to the holder 3-210 by the positioning portion 3-335A'. The second flat portion 3-335' is extends in a direction that is perpendicular to the optical axis 3-O and close to the center of the optical axis 3-O. Therefore, when viewed in a direction that is parallel to the optical axis 3-O, the second flat portion 3-335' overlaps the holder 3-210.

With the structure described above, the curved portion 3-333' connects the first flat portion 3-334' and the main body portion 3-332', so that the stress of the curved portion 3-333' is not concentrated on a point or a line, and is not easy to break. The elastic element 3-400 is connected to the second flat portion 3-335', so that the stress of the elastic element 3-400 is not concentrated on a point or a line, and is not easy to break. In addition, the second flat portion 3-335' is connected to the holder 3-210, more specifically, the second flat portion 3-335' is disposed on the holder, so the holder 3-210 also relatively supports the second flat portion 3-335', so that the elastic element 3-400 is not easy to break.

In addition to the advantages mentioned above, the positioning may be completed quickly when assembling the optical element driving mechanism 3-1. More specifically, the plate coil 3-320, the elastic element 3-400, and the metal substrate 3-330' are on the same plane after being formed integrally, so the positioning and assembling of the plate coil 3-320, the elastic element 3-400, and the metal substrate 3-330' may be quickly completed just by bending the metal substrate 3-330' to form the curved portion 3-333' and placing the plate coil 3-320 in the groove 3-212. Thus, many steps of assembling may be omitted.

In addition, in a mechanism with the OIS function, it is necessary to control a movement of an optical element in the direction that is perpendicular to the optical axis 3-O. Therefore, the plate coil 3-320 is usually arranged in a direction that the plane 3-321 is perpendicular to the optical axis 3-O (for example, the plate coil 3-320 is embedded in the base 3-120), so that the direction of the electromagnetic force generated by the plate coil 3-320 and the magnetic element 3-310 is perpendicular to the optical axis 3-O. Therefore, in this embodiment, the metal substrate 3-330' is no need to bend to form the curved portion 3-333' and may directly apply to the mechanism with OIS function.

Figure 9:
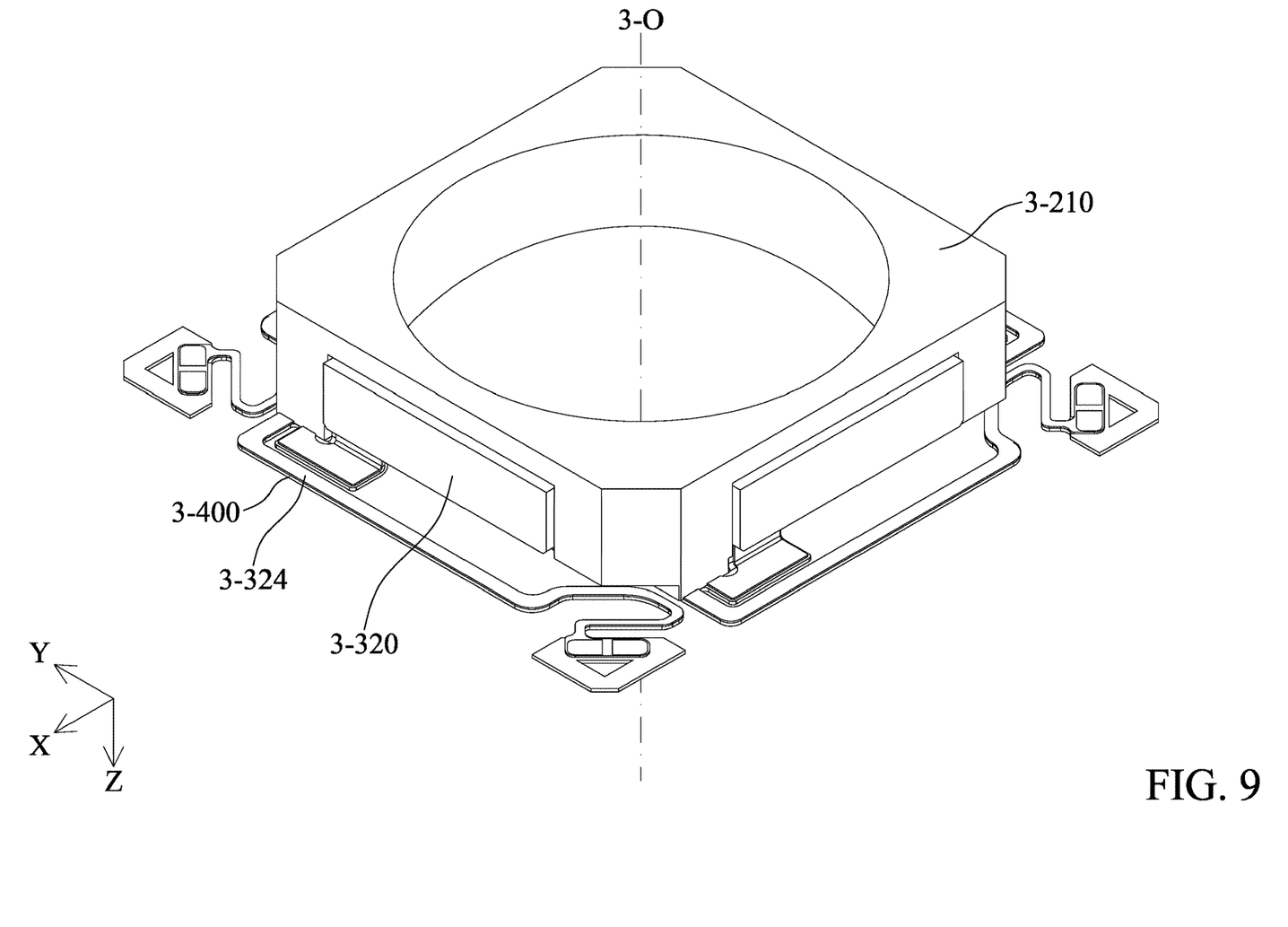
FIG. 9 is a schematic diagram of a portion of a structure of an optical element driving mechanism according to another embodiment of the disclosure.
Figure 10:
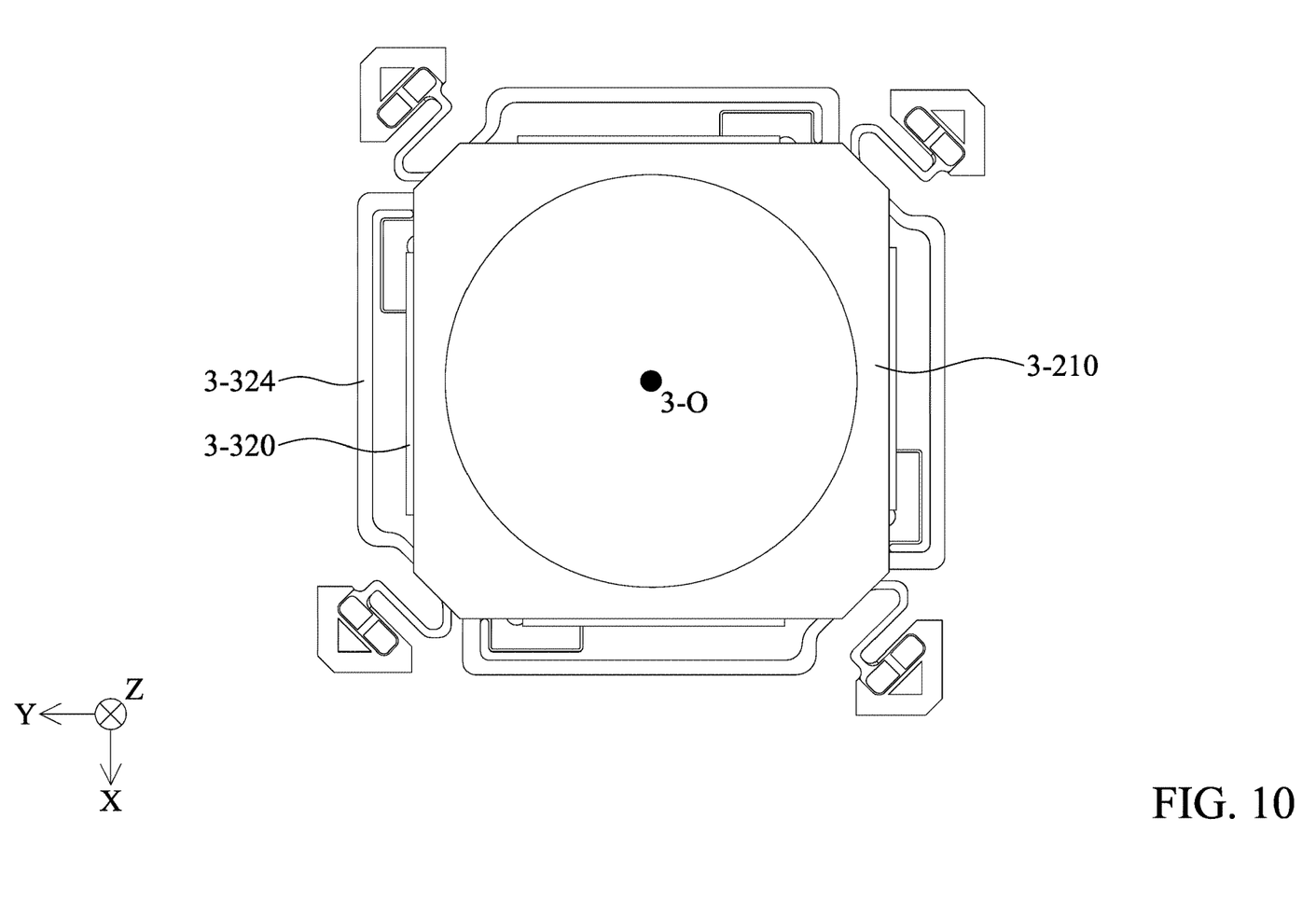
FIG. 10 is a schematic diagram of a partial structure of an optical element driving mechanism according to another embodiment of the disclosure.

Refer to FIG. 9 and FIG. 10, which are schematic diagrams of a partial structure of the optical element driving mechanism 3-1 according to another embodiment of the present disclosure. As shown in FIG. 9, in this embodiment, the optical element driving mechanism 3-1 further includes an electrical connection portion 3-324, and the plate coil 3-320, the electrical connection portion 3-324, the elastic element 3-400, and the metal substrate 3-330' are integrally formed. The electrical connection portion 3-324 is connected to the elastic element 3-400 from below. In other words, in the viewing angle of FIG. 9, the electrical connection portion 3-324 is connected to the elastic element 3-400 from above. As shown in FIG. 10, when viewed in a direction that is parallel to the optical axis 3-0, the electrical connection portion 3-324 overlaps the elastic element 3-400. In this embodiment, the required electronic elements may be designed in the plate coil 3-320, and electrically connect with other different elements in the optical element driving mechanism 3-1 through the electrical connection portion 3-324, such as a signal cable, etc. That is, the plate coil 3-320, the required electronic elements and electrical connection portions 3-324 are manufactured at the same time, which may not only simplify the circuit and reduce the number of steps required for assembling, but also aid in the miniaturization of the mechanism.

As described above, in these embodiments of this disclosure, the plate coil 3-320 is directly connected to the elastic element 3-400, so that a miniature optical element driving mechanism with simplified circuitry can be obtained.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism having an optical axis comprising:
   a fixed portion;
   a movable portion, moving relative to the fixed portion;
   a driving portion, driving the movable portion to move relative to the fixed portion, comprising a plate coil;
   an elastic element, connecting the fixed portion and the movable portion; and
   a metal substrate comprising a main body portion, a protruding portion and an extending portion, wherein the main body portion is connected to the plate coil, the protruding portion is connected to the elastic element, the extending portion is between the main body portion and the protruding portion, the extending portion is parallel to the main body portion, the extending portion is perpendicular to the protruding portion, and the extending portion and the main body portion each comprises a first edge and a second edge, and a maximum width defined by the first edge and the second edge of the extending portion is smaller than a width defined by the first edge and the second edge of the main body portion.

2. The optical element driving mechanism as claimed in claim 1, wherein the plate coil has a plane, and the plate coil is connected to the elastic element.

3. The optical element driving mechanism as claimed in claim 2, wherein the movable portion has a groove, and the plate coil is disposed on the groove of the movable portion, and the plane is parallel with the optical axis.

4. The optical element driving mechanism as claimed in claim 2, wherein the metal substrate has a substrate plane, and the substrate plane is parallel with the plane of the plate coil.

5. The optical element driving mechanism as claimed in claim 1, wherein when viewed in a direction that is parallel to the optical axis, the plate coil partially overlaps the movable portion.

6. The optical element driving mechanism as claimed in claim 1, further comprising a welding portion connected to the plate coil and the elastic element.

7. The optical element driving mechanism as claimed in claim 1, wherein the plate coil is integrally formed with the metal substrate.

8. The optical element driving mechanism as claimed in claim 1, wherein when viewed in a direction that is perpendicular to the optical axis, the metal substrate overlaps the plate coil.

9. The optical element driving mechanism as claimed in claim 1, wherein the metal substrate is closer to the movable portion than the plate coil.

10. The optical element driving mechanism as claimed in claim 1, wherein the plate coil is closer to the movable portion than the metal substrate.

11. The optical element driving mechanism as claimed in claim 1 wherein the plate coil, the elastic element, and the metal substrate are integrally formed.

12. An optical element driving mechanism, having an optical axis, comprising:
   a fixed portion;
   a movable portion, moving relative to the fixed portion;
   a driving portion, driving the movable portion to move relative to the fixed portion; and
   an elastic element, connecting the fixed portion and the movable portion;
   wherein the driving portion comprises a plate coil, the plate coil has a plane, and the plate coil is connected to the elastic element;
   wherein the optical element driving mechanism further comprises a metal substrate, the metal substrate is connected to the plate coil and the elastic element, and the plate coil, the elastic element, and the metal substrate are integrally formed;
   wherein the metal substrate comprises:
   a main body portion, connected with the plate coil;
   a curved portion, connected to the main body portion, and one end of the curved portion extends in a direction that is parallel to the optical axis, and the other end of the curved portion extends in a direction that is perpendicular to the optical axis;
   a first flat portion, connected to the curved portion; and
   a second flat portion, connected to the first flat portion and the elastic element;
   wherein when viewed in a direction that is parallel to the optical axis, the first flat portion partially overlaps the plate coil.

13. The optical element driving mechanism as claimed in claim 12, wherein the first flat portion extends in a direction that is perpendicular to the optical axis and away from a center of the optical axis.

14. The optical element driving mechanism as claimed in claim 12, wherein the second flat portion extends in a direction that is perpendicular to the optical axis and is close to a center of the optical axis.

15. The optical element driving mechanism as claimed in claim 12, wherein the second flat portion has a positioning portion, and the second flat portion is connected to the movable portion through the positioning portion.

16. The optical element driving mechanism as claimed in claim 12, wherein when viewed in a direction that is parallel to the optical axis, the second flat portion overlaps the movable portion.

17. The optical element driving mechanism as claimed in claim 12, further comprising an electrical connection portion, wherein the electrical connection portion is connected to the elastic element, and the electrical connection portion, the plate coil, the elastic element, and the metal substrate are integrally formed.

18. The optical element driving mechanism as claimed in claim 17, wherein when viewed in a direction that is parallel to the optical axis, the electrical connection portion overlaps the elastic element.

19. An optical element driving mechanism, having an optical axis, comprising:
   a fixed portion;
   a movable portion, moving relative to the fixed portion;
   a driving portion, driving the movable portion to move relative to the fixed portion, comprising a plate coil;
   an elastic element, connecting the fixed portion and the movable portion; and
   two metal substrates, corresponding to the plate coil, wherein there is a gap in the middle of the metal substrates.

* * * * *